(12) United States Patent
Guo

(10) Patent No.: US 8,904,836 B2
(45) Date of Patent: Dec. 9, 2014

(54) HANDLE FIXING MECHANISMS AND METHODS OF MAKING AND USING THEREOF

(71) Applicant: Scyan Electronics LLC, Issaquah, WA (US)

(72) Inventor: Yan Guo, Issaquah, WA (US)

(73) Assignee: Scyan Electronics LLC, Issaquah, WA (US)

( * ) Notice: Subject to any disclaimer, the term of this patent is extended or adjusted under 35 U.S.C. 154(b) by 0 days.

(21) Appl. No.: 13/943,802

(22) Filed: Jul. 17, 2013

(65) Prior Publication Data

US 2014/0020438 A1    Jan. 23, 2014

Related U.S. Application Data

(60) Provisional application No. 61/672,771, filed on Jul. 18, 2012.

(51) Int. Cl.
| | |
|---|---|
| *B60R 25/02* | (2013.01) |
| *F16D 11/16* | (2006.01) |
| *E05B 27/00* | (2006.01) |
| *E05B 3/00* | (2006.01) |
| *F16D 23/12* | (2006.01) |
| *E05B 63/04* | (2006.01) |

(52) U.S. Cl.
CPC ............... *E05B 3/003* (2013.01); *F16D 11/16* (2013.01); *E05B 27/00* (2013.01); *F16D 23/12* (2013.01); *E05B 63/04* (2013.01)
USPC ........... 70/224; 292/348; 292/352; 292/336.3

(58) Field of Classification Search
USPC ......... 70/224, 462; 292/348, 350, 352, 336.3, 292/DIG. 53
See application file for complete search history.

(56) References Cited

U.S. PATENT DOCUMENTS

| | | | | |
|---|---|---|---|---|
| 826,187 | A | * | 7/1906 | McSpadden ................. 292/353 |
| 1,621,174 | A | * | 3/1927 | Schlage ........................ 292/353 |
| 2,111,254 | A | * | 3/1938 | Tong .............................. 292/353 |
| 2,156,486 | A | * | 5/1939 | Wertz ............................ 292/354 |
| 2,252,855 | A | * | 8/1941 | Lasch ........................... 292/353 |
| 2,369,494 | A | * | 2/1945 | Schlage ........................ 292/352 |
| 2,660,466 | A | * | 11/1953 | Cerf, Jr. ........................ 292/352 |
| 3,177,024 | A | * | 4/1965 | Krook et al. ................. 292/353 |
| 3,896,644 | A | * | 7/1975 | Nagy et al. .................... 70/149 |
| 4,342,478 | A | * | 8/1982 | Foshee .......................... 292/352 |
| 4,356,739 | A | * | 11/1982 | Brown et al. .................. 74/548 |
| 4,471,984 | A | * | 9/1984 | Bellantuono ................. 292/350 |
| 4,502,720 | A | * | 3/1985 | Fayerman et al. ............ 292/348 |
| 4,664,433 | A | | 5/1987 | Solovieff |
| 4,672,829 | A | | 6/1987 | Gater et al. |
| 4,698,989 | A | * | 10/1987 | Zuckerman ................... 70/380 |
| 4,844,522 | A | | 7/1989 | Pechar |
| 5,364,139 | A | | 11/1994 | Bergen et al. |

(Continued)

FOREIGN PATENT DOCUMENTS

EP        1624141 B1    8/2007

*Primary Examiner* — Suzanne Barrett

(57) ABSTRACT

A lock system, comprising a stationary member, a hand operated member, and a coupling member, wherein the stationary member and the hand operated member are configured to be operably coupled by the coupling member, and wherein the connection member is configured to remain within the stationary member and to extend into or retract from the hand operated member.

16 Claims, 8 Drawing Sheets

(56) References Cited

U.S. PATENT DOCUMENTS

| | | |
|---|---|---|
| 6,145,353 A | 11/2000 | Doucet |
| 6,695,365 B2 * | 2/2004 | Chong et al. ............ 292/348 |
| 6,845,642 B2 * | 1/2005 | Imedio Ocana ............ 70/277 |
| 6,908,126 B2 * | 6/2005 | Senger ............ 292/348 |
| 7,104,098 B2 * | 9/2006 | Romero et al. ............ 70/224 |
| 7,143,477 B2 * | 12/2006 | Dalsing et al. ............ 16/412 |
| 7,574,883 B2 | 8/2009 | Grampurohit |
| 7,775,075 B2 | 8/2010 | Grampurohit |
| 7,900,489 B2 | 3/2011 | Roth et al. |
| 8,011,703 B2 * | 9/2011 | Newman et al. ............ 292/347 |
| 8,056,379 B2 | 11/2011 | Dickhans et al. |
| 8,272,241 B2 * | 9/2012 | Brown et al. ............ 70/277 |
| 8,336,349 B2 | 12/2012 | Thimmappa et al. |
| 8,491,023 B2 | 7/2013 | Brannaman et al. |
| 2002/0105195 A1 * | 8/2002 | Adelmeyer ............ 292/347 |
| 2009/0025436 A1 | 1/2009 | Roth et al. |
| 2009/0282881 A1 | 11/2009 | Grampurohit |
| 2013/0008213 A1 | 1/2013 | Brown et al. |
| 2013/0227996 A1 | 9/2013 | McKibben et al. |

* cited by examiner

HANDLE FIXING MECHANISMS AND METHODS OF USING THEREOF
FIGURES

HANDLE FIXING MECHANISMS AND METHODS OF USING THEREOF

FIGURES

HANDLE FIXING MECHANISMS AND METHODS OF USING THEREOF
FIGURES

HANDLE FIXING MECHANISMS AND METHODS OF USING THEREOF
FIGURES

SECTION A-A

HANDLE FIXING MECHANISMS AND METHODS OF USING THEREOF

FIGURES

SECTION B-B

HANDLE FIXING MECHANISMS AND METHODS OF MAKING AND USING THEREOF

CROSS REFERENCE TO RELATED APPLICATIONS

This application claims the benefit of the filing date of U.S. Provisional Application Ser. No. 61/672,771 filed Jul. 18, 2012 under 35 U.S.C. 119(e), the entire disclosure of which is incorporated by reference herein.

TECHNICAL FIELD

This disclosure relates to devices, apparatuses, systems, and tools having a handle component. Particularly, the disclosure relates to handle fixing mechanism.

BACKGROUND

Unless otherwise indicated herein, the materials described in this section are not prior art to the claims in this application and are not admitted to be prior art by inclusion in this section.

Handles are integral parts of apparatuses, systems, and devices such as locks, doors, and tools. For example, door locks often have handles attached. The handles facilitate the opening and closing of the door that the locks are mounted on. The handle need to point to left for a door opening on the right or right for a door opening on the left.

Some locks have the handle at a fixed direction. This means that user needs to choose the lock with the correct handle direction for a desired door; and that lock manufacturers needs to manufacture two different sets of locks for the same lock model.

Some locks have handles with changeable orientations. However, special tools may be needed to dissemble and reassemble the lock handle. In addition, a person could use the tool to remove the lock handle from outside causing the safety concern.

There is a need for a lock handle that a user can change the handle direction conveniently and is economic to manufacture.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

In one aspect, the disclosure provides a handle fixing mechanism. In one embodiment, the handle fixing mechanism includes a stationary member, a hand operated member, and a coupling member. The stationary member and the hand operated member are configured to be operably coupled by the coupling member. The connection member is configured to remain within the stationary member and to extend into or retract from the hand operated member.

In one embodiment, the handle fixing mechanism includes a stationary member and a hand operated member. The stationary member and the hand operated member may be coupled or uncoupled through a coupling member. The connection member has a first end and a second end. When coupling the stationary member and the hand operated member, the first end of the coupling member is configured to remain within the stationary member and the second end is configured to extend into the hand operated member. When uncoupling the stationary member from the hand operated member, the second end of the coupling member is configured to retract from the hand operated member and into or through the stationary member.

When the stationary member and the hand operated member are uncoupled, the hand operated member may be disconnected or removed from the stationary member. In one embodiment, the hand operated member may rotate freely or independently relatively to the stationary member. When the stationary member and the hand operated member are operably coupled, the hand operated member adopts a direction that is fixed relative to the stationary member and is configured to rotate together with the stationary member.

In one embodiment, the handle fixing mechanism includes a stationary member having a cylindrical structure and a hand operated member having a cylindrical housing. The cylindrical structure may have openings. In one example, the cylindrical structure may include one pair of openings: a first opening and a second opening. The first opening may be from about 100 degrees to about 180 degrees apart from the second opening. In another example, the cylindrical structure may include a series of openings. The series of openings may be apart from each other with equal degrees or various degrees. The cylindrical structure is configured to fit within the cylindrical housing.

The cylindrical housing may include a third opening. By rotating the cylindrical housing relatively to the cylindrical structure, the third opening may align with either the first opening or the second opening.

A coupling member such as a bolt having a first end and a second end may be slidably received in the first opening or the second opening. Its second end is configured to slide into the third opening when the first or the second opening is aligned with the third opening. The first end has a fixing mechanism so that when the second end slides into the third opening of the cylindrical housing, the first end remains in the cylindrical structure. For example, the first end may have a diameter bigger than the diameter of the third opening. Therefore, the first end is configured to be received in only the first or the second opening but not in the third opening.

When the coupling member slides into the first or the second opening but not in the third opening, the cylindrical structure is uncoupled from the cylindrical housing and may be removed or disconnected from the cylindrical housing. When the coupling member slides into the first or the second opening and the third opening, the cylindrical structure is connected to the cylindrical housing and is adapted to rotate with the cylindrical housing. The direction of the hand operated member is dependent upon whether the bolt connects the third opening with the first opening or the second opening.

In another aspect, the disclosure provides a lock system having the above described handle fixing mechanism. In one embodiment, the lock system may include a lock assembly and the hand operated member as described above connected to the lock assembly. The lock assembly may include the cylindrical structure as described above and an elongated core structure. The elongated core structure is configured to be housed within and to rotate concentrically with the cylindrical structure.

The elongated core structure may include a driver portion corresponding to the position of the first openings or the second opening on the cylindrical structure. The driver portion is configured to drive the above described bolt into the first or the second opening or further into the aligned third opening.

In one embodiment, the driver portion may be a column having a cross section having a long axis and a short axis. The long axis has a diameter bigger than a diameter of the short axis. When rotating the elongated core structure, the driver portion having the long axis is configured to push the bolt on the first end through the first or the second opening and into the third opening, if aligned, and therefore connect the cylindrical structure and the cylindrical housing. When rotating the elongated core structure and aligning the driver portion having the short axis with the position of the first or the second opening, the bolt may be pushed out of the third opening on the second end through the third opening therefore separating the cylindrical structure from the cylindrical housing.

In another embodiment, a lock cylinder may be housed within the cylindrical housing. The lock cylinder may be rotationally connected to the elongated core structure.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments arranged in accordance with the disclosure and are, therefore, not to be considered limiting of its scope, the disclosure will be described with additional specificity and detail through use of the accompanying drawings, in which:

DETAILED DESCRIPTION

Figure 1:
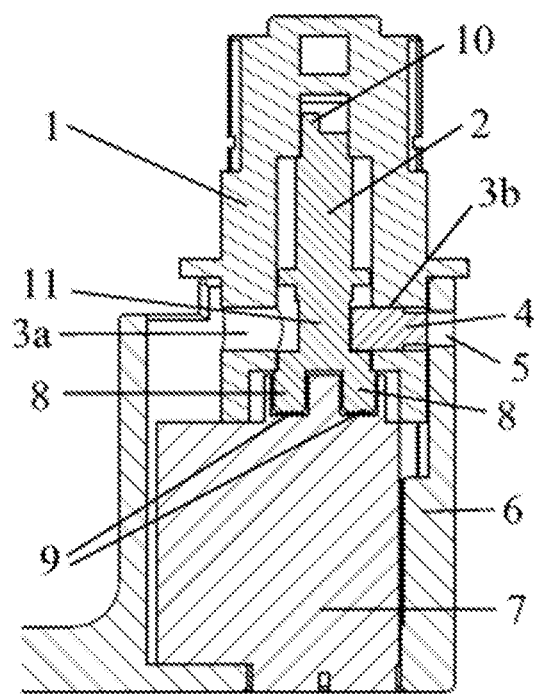
FIG. 1 shows a representative handle fixing mechanism, the bolt (4) is inside cylindrical structure (1), wherein the cylindrical structure (1) is separated from the cylindrical housing (6)

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to handle fixing mechanisms and apparatus, systems, devices, and lock products having such handle fixing mechanisms.

In one aspect, the disclosure provides handle fixing mechanisms. The handle fixing mechanisms allow a user to conveniently change the direction of the handles. In one embodiment, the handle fixing mechanism includes a stationary member and a hand operated member. The stationary member and the hand operated member may be connected or disconnected through a coupling member.

In one embodiment, the connection member has a first end and a second end. When coupling the stationary member and the hand operated member, the first end of the coupling member is configured to remain within the stationary member and the second end is configured to extend into the hand operated member.

When decoupling the stationary member from the hand operated member, the second end of the coupling member is configured to retract from the hand operated member and into or through the stationary member. For example, when pushed from the second end, the connection member may leave the hand operated member and back into the stationary member.

When the stationary member and the hand operated member are disconnected, the hand operated member may rotate freely or independently relatively to the stationary member. When the stationary member and the hand operated member are connected by the coupling member, the hand operated member adopts a direction that is fixed relative to the stationary member and is configured to rotate with the stationary member.

In one embodiment, the handle fixing mechanism may include a stationary member having a cylindrical structure (1) and a hand operated member having a cylindrical housing (6). The cylindrical structure (1) is configured to fit within the cylindrical housing (6). In one embodiment, the cylindrical structure (1) is configured to fit snugly within the cylindrical housing (6).

The cylindrical structure (1) may include at least one pair of openings: a first opening (3a) and a second opening (3b). The first opening (3a) and the second opening (3b) may be apart from each other. For example, the first opening (3a) may be from about 10 degrees to about 180 degrees, from about 60 degree to about 180 degrees, from about 90 degree to about 180 degrees, from about 100 degrees to about 180 degrees, from about 120 degrees to about 180 degrees, from about 150 degrees to about 180 degrees apart from the second opening (3b). In one example, the first opening (3a) is about 180 degrees apart from the second opening (3b), i.e., opposite from each other.

The cylindrical housing (6) may include a third opening (5). By rotating the cylindrical housing (6) relatively to the cylindrical structure (1), the third opening (5) may align with either the first opening (3a) or the second opening (3b).

The first opening (3a) and the second opening (3b) may have the same or different diameters. In addition, the first opening (3a) and the second opening (3b) may have the same shape or different shapes.

In one embodiment, the first opening (3a) and the second opening (3b) may have the same or the different diameter with the third opening (5). For example, the first opening (3a) and the second opening (3b) may have a bigger diameter than the third opening (5). In one embodiment, the first opening (3a) and the second opening (3b) may have the same or different shape from the third opening (5). For example, all three openings (5) may be a circle, an oval, or a polygon including, without limitation, a triangle, a square, a rectangle, a pentagon, a hexagon, a heptagon, an octagon, and so on. Alternatively, the first opening (3a) and the second opening (3b) may be a circle and the third opening (5) may be an oval or a polygon.

The connection member may be any shape or configuration. In one embodiment, the coupling member may be a bolt (4). The bolt (4) may have a cross section of any shape. In one embodiment, the bolt (4) may be cylindrical with a round or an oval cross section. In one embodiment, the bolt (4) may have a polygon cross section including, without limitation, triangle, square, rectangle, pentagon, hexagon, heptagon, octagon, and so on.

The bolt (4) may have a first end and a second end. The first end and the second end may have the same or different diameters. For example, the first end may have a bigger diameter than the second end. The first end and the second end may have the same or different shapes. For example, the first end may be a circle and the second end may be an oval or a polygon.

The coupling member such as a bolt (4) may be slidably received in the first opening (3a) or the second opening (3b). Its second end is configured to slide into the third opening (5) when the first opening (3a) or the second opening (3b) is aligned with the third opening (5).

The coupling member is configured in such a way that when the second end slides into the third opening (5) of the cylindrical housing (6), the first end remains in the cylindrical structure (1). In one embodiment, the first end may have a diameter that allows the first end to fit within the first opening (3a) or the second opening (3b) but is bigger than the diameter of the third opening (5). The second end may have a diameter that allows the second end to fit within both the first opening (3a) or the second opening (3b) and the third opening (5). Therefore, the first end is configured to stay in the first opening (3a) or the second opening (3b) but not go into the third opening (5); and the second end is configured to fit into both the first opening (3a) or the second opening (3b) and the third opening (5).

In another embodiment, the first end may have a cross section having a first shape and the second end may have a cross section having a second shape. The first shape is configured to fit within the first opening (3a) or the second opening (3b) but not the third opening (5). The second shape is configured to fit within both the first opening (3a) or the second opening (3b) and the third opening (5). For example, the first shape may be a circle and the second shape may be an oval or a polygon. The first shape may have a same diameter as the second shape. Alternatively, the first shape may have a bigger diameter than the second shape.

In a further embodiment, the first end may have a fixing mechanism such as a bent or a hook so that the first end is configured to remain in the cylindrical structure (1).

When the coupling member slides into the first opening (3a) or the second opening (3b) but not in the third opening (5), the cylindrical structure (1) is separated from the cylindrical housing (6) and is removable or disconnectable from the cylindrical housing (6). In this configuration, the hand operated member may be rotated freely to any orientation along the axis of the cylindrical housing (6) relative to the stationary member.

When the coupling member slides into the third opening (5) through the first opening (3a) or the second opening (3b), the cylindrical structure (1) is connected to the cylindrical housing (6). In this configuration, the orientation of the hand operated member is fixed relative to the stationary member. Therefore, the direction of the hand operated member is dependent upon whether the coupling member connects the third opening (5) with the first opening (3a) or the second opening (3b). In addition, in this configuration, the stationary member and the hand operated members are connected through the coupling member and therefore are configured to rotate together.

In another aspect, the disclosure provides a lock system having the above described handle fixing mechanism. In one embodiment, the lock system may include a lock assembly having a stationary member and a hand operated member. The stationary member may include an above described cylindrical structure (1) and an elongated core structure (2). The elongated core structure (2) is configured to be housed within and to rotate concentrically with the cylindrical structure (1). The hand operated member may include an above described cylindrical housing (6).

The elongated core structure (2) may include a driver portion (11) corresponding to the position of the first openings (3a) or the second opening (3b) on the cylindrical structure (1). The driver portion (11) is configured to drive the above described coupling member into the first opening (3a) or the second opening (3b) or further into the third opening (5) if the third opening (5) is aligned with the first opening (3a) or the second opening (3b).

In one embodiment, the driver portion (11) may be a column having a cross section having a long axis and a short axis. The long axis has a diameter bigger than a diameter of the short axis. For example, the cross section may have an oval. When rotating the elongated core structure (2), the driver portion (11) having the long axis is configured to push the coupling member on the first end into the first opening (3a) or the second opening (3b) and further into the third opening (5), if aligned, and therefore connect the cylindrical structure (1) and the cylindrical housing (6). When rotating the elongated core structure (2) and aligning the driver portion (11) having the short axis with the position of the first opening (3a) or the second opening (3b), the bolt (4) may be pushed out of the third opening (5) from the second end through the third opening (5) therefore separating the cylindrical structure (1) from the cylindrical housing (6).

In one embodiment, a lock cylinder may be housed at least partially within the cylindrical structure (1). The lock cylinder (7) may be rotationally connected to the elongated core structure (2). A user may use a key to rotate the lock cylinder (7) therefore causing the rotation of the elongated core structure (2), which in turn controls the orientation of the long axis of the driver portion (11). When the driver portion (11) having the long axis pushes the coupling member on the first end into the aligned third opening through (5) the first opening (3a) or the second opening (3b), the lock assembly and the hand operated member connects and are configured to rotate together. When the driver portion (11) having the short axis approximately aligns with the position of the first opening (3a) or the second opening (3b), the coupling member may be pushed out of the third opening (5) on the second end through the third opening (5) therefore separating the lock assembly from the hand operated member. The user may rotate the hand operated member freely and align either the first opening (3a) or the second opening (3b) with the third opening (5) to achieve a desired orientation of the hand operated member.

The disclosed lock handle fixing mechanism has the advantages over exiting locks and handle systems including, without limitation, being simple, easy to use, versatile, and potentially having a reduced production cost or a simpler production process. For example, as one of the advantages, the disclosed novel handle fixing mechanism allows a user to use a key to disconnect the handle from a lock assembly so that the user can change and set the handle to a desired orientation. For example, the lock handle direction may be reversed from right to left or from left to right. Therefore, the same lock assembly can be used for a door opening either from the right or from the left.

Figure 2:
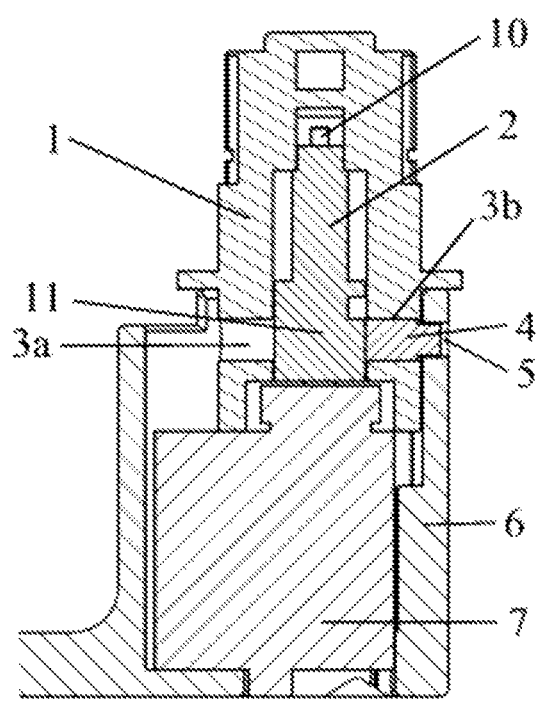
FIG. 2 shows a representative handle fixing mechanism, the bolt (4) is inside both cylindrical structure (1) and the cylindrical housing (6), wherein the cylindrical structure (1) is connected with the cylindrical housing (6)

In one embodiment, the disclosure provides a lock system having a lock assembly and a hand operated member connected to the lock assembly. As shown in FIGS. 1 and 2, in one example, the lock assembly may include a cylindrical structure (1) and an elongated core structure (2). The elongated core structure (2) may be housed inside the cylindrical structure (1). Both structures are configured to rotate concentrically. The elongated core structure (2) is configured to rotate concentrically within the cylindrical structure (1). The cylindrical structure (1) may include openings. In one example, the cylindrical structure include a first opening (3a) and a second opening (3b). The first opening (3a) and the second opening (3b) may be from about 100 degrees apart to about 180 degrees apart. For example, (3a) and (3b) may be positioned approximately opposite to each other. In another embodiment, the cylindrical structure (1) may have a series of first openings forming a circle on the wall of the cylindrical structure (1).

The elongated core structure (2) has a driver portion (11) corresponding to the position of the pair of openings (3a) and (3b). The driver portion (11) may include a column having a cross section having a long axis and a short axis. The long axis has a diameter bigger than a diameter of the short axis. The driver portion (11) having the long axis may fit snuggly inside the cylindrical structure (1). For example, the driver portion (11) may have an elliptic cylindrical shape having a long axis (major axis) and a short axis (minor axis).

Figure 3:
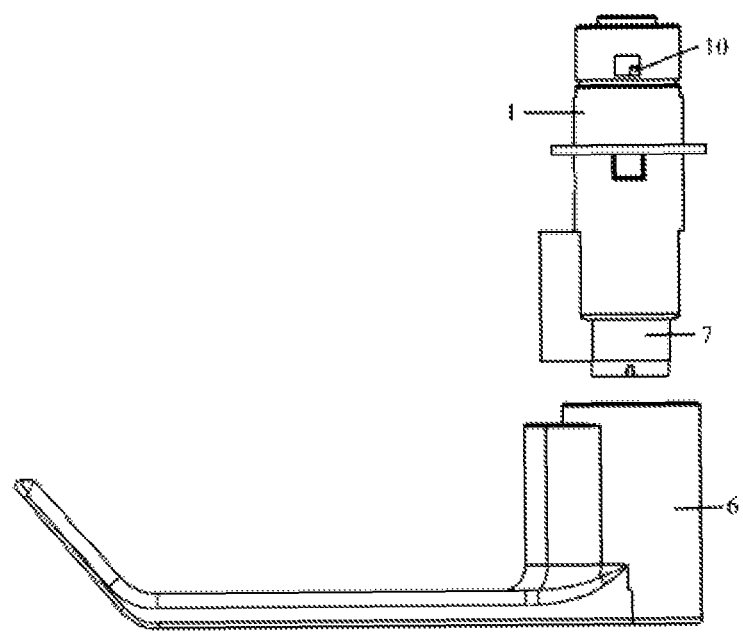
FIG. 3 shows an exploded view of a representative handle fixing mechanism including a representative assembly and a representative hand operated member.

As shown in FIG. 3, the hand operated member may include a cylindrical housing (6) and a handle corrected to the cylindrical housing (6). Referring back to FIGS. 1 and 2, the cylindrical structure (1) may be housed inside the cylindrical housing (6). Therefore, the cylindrical housing (6) and cylindrical structure (1) may rotate concentrically. The cylindrical housing (6) may have a third opening (5). The third opening (5) is configured to align with one of the openings, (3a) or (3b). In one embodiment, (3a) or (3b) may have a diameter not less than a diameter of the third opening (5).

Figure 4:
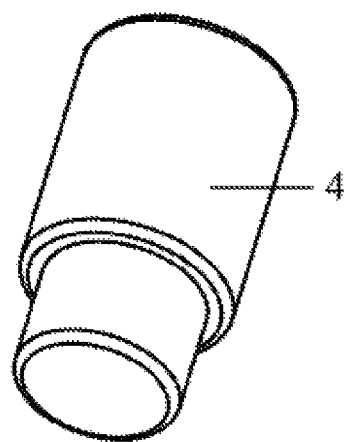
FIG. 4 shows a front view of a representative bolt (4)

A coupling member such as a bolt (4) may be slidably received in (3a) or (3b) and is configured to slide into the third opening (5) when either first openings (3a) or second opening (3b) and the third opening (5) are aligned. As shown in FIG. 4, the bolt (4) may have a first end and a second end. The first end may have a diameter not less than, for example, bigger than, the diameter of the second end.

Referring back to FIGS. 1 and 2, the third opening (5) may align with one of the openings of (3a) or (3b), for example, (3a). The opening (3a) may have a diameter not less than, for example, bigger than, the diameter of the third opening (5). Also, the diameter of the first end of the bolt (4) may be bigger than the diameter of the third opening (5). Therefore, the first end of the bolt (4) slides into the opening (3a) but may not fit in the third opening (5); however, the second end may slides into both the opening (3a) and the third opening (5). Therefore, in one example, the bolt (4) will fit snuggly into the aligned opening (3a) and opening (5), however, will not fall through.

When the bolt (4) resides in the opening (3a) but not in the second opening (5), the cylindrical structure (1) is separated from the cylindrical housing (6), allowing the hand operated member to be separated from the lock assembly. In operation, a user may pull the hand operated member from the lock assembly, reverse the direction of the handle, and then place the hand operated member back onto the lock assembly aligning the first opening (3b) with the second opening (5). The bolt (4) can be pushed into the aligned openings (3b) and (5) coupling the cylindrical structure (1) with the cylindrical housing (6). Now, both structures will rotate together.

As shown in FIGS. 1 and 2, a lock cylinder (7) may be housed within the cylindrical housing (6). The lock cylinder (7) may be rotationally connected to the elongated core structure (2). For example, the elongated core structure (2) may have a protruding structure (8) at a first end and the lock cylinder (7) has an indenting structure (9). The indenting structure (9) may receive the protruding structure (8) therefore coupling the lock cylinder (7) with the elongated core structure (2) allowing the elongated core structure (2) rotates with the lock cylinder (7).

When rotating the elongated core structure (2), the driver portion (11) having the long axis is configured to push the bolt (4) into the (3a) or (3b) and the third opening (5) coupling the cylindrical structure (1) and the cylindrical housing (6). When rotating the elongated core structure (2) and aligning the driver portion (11) having the short axis with the position of the (3a) or (3b), the bolt (4) may be pushed out of the third opening (5) from the second end Through the third opening (5) therefore separating the cylindrical structure (1) from the cylindrical housing (6).

In one embodiment, the lock cylinder (7) may be configured to receive and therefore rotate by a key. Therefore, a user may use a key to rotate the lock cylinder (7), which causes the rotation of the elongated core structure (2). The user may rotates the elongated core structure (2) and align the driver portion (11) having the short axis with, for example, the opening (3a). By pushing on the second end of the bolt (4) through the third opening (5), the user may slide the bolt (4) out of the third opening (5) separating the cylindrical structure (1) from the cylindrical housing (6). The user may reverse the handle direction, for example, by approximately 180 degrees, to a desired direction aligning the third opening (5) with the opening (3b). Then, the user may rotate the elongated core structure (2) to such a position that the driver portion (11) having the long axis aligns with the first opening (3b). The driver portion (11) pushes the bolt (4) into the opening (5) coupling the cylindrical structure (1) and the cylindrical housing (6) and locking the handle into a desired position. Therefore, the disclosed lock handle fixing mechanism allows a user to change the lock handle direction using the lock key.

Figure 5:
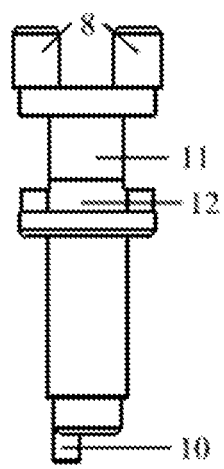
FIG. 5 shows a front view of a representative elongated core structure (2) including a representative driver portion (11) having an elliptic cylindrical shape, a representative protruding structure (8) at the first end, a representative protruding structure (10) eccentrically located at the second end, and a representative groove (12).
Figure 6:
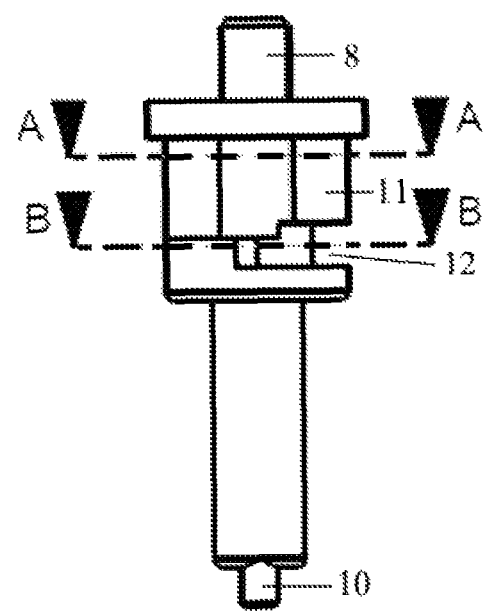
FIG. 6 shows a side view of the representative elongated core structure (2) shown in FIG. 5.
Figure 7:
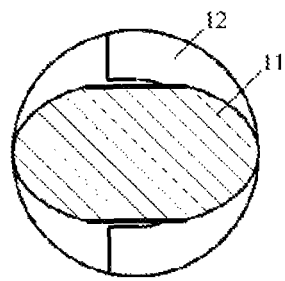
FIG. 7 shows a sectional view of the representative driver portion (11) shown in FIG. 6 along the A-A.
Figure 8:
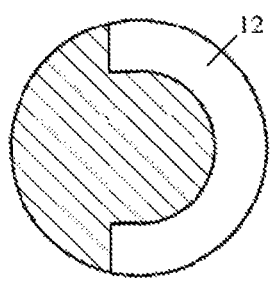
FIG. 8 shows a sectional view of the representative groove (12) shown in FIG. 6 along the B-B.

In a further embodiment, as shown in FIGS. 5 and 6, the elongated core structure (2) may have protruding structure (10) eccentrically located at a second end. The elongated core structure (2) may include a groove (12) configured to receive a screw. Therefore, inserting the screw in the groove (12) limits the rotation of the elongated core structure (2).

In another aspect, the disclosure provides lock systems and devices having the above described handle fixing mechanisms.

In further aspects, the disclosure provides doors, furniture, buildings, apparatus, systems and devices with locks having the above described handle fixing mechanism.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, may be arranged, substituted, combined, separated, and designed in a wide variety of different configurations, all of which are explicitly contemplated herein.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components. In addition, the "operably coupled," "operably connected," "coupled," or "connected" may be either directly coupled or connected or indirectly coupled or connected.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, may be arranged, substituted, combined, separated, and designed in a wide variety of different configurations, all of which are explicitly contemplated herein.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

Variations of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A handle fixing mechanism, comprising
a stationary member,
a hand operated member, and
a coupling member,
wherein the stationary member and the hand operated member are configured to be operably coupled by the coupling member, and wherein the coupling member is configured to remain within the stationary member and to extend into or retract from the hand operated member;
wherein the stationary member comprises a cylindrical structure, wherein the hand operated member comprises a cylindrical housing, and wherein the cylindrical structure is configured to fit within the cylindrical housing; and
wherein the cylindrical structure comprises a first opening and a second opening, wherein the cylindrical housing comprises a third opening, and wherein the third opening is configured to align with either the first opening or the second opening.

2. The handle fixing mechanism of claim 1, wherein the coupling member comprises a first end and a second end, and wherein the first end is configured to remain within the stationary member and the second end is configured to extend into or retract from the hand operated member.

3. The handle fixing mechanism of claim 1, wherein, when the stationary member is operably uncoupled from the hand operated member, the hand operated member is configured to be removable or disconnectable from the stationary member.

4. The handle fixing mechanism of claim 1, wherein, when the stationary member is operably uncoupled from the hand operated member, the hand operated member is configured to rotate independently relative to the stationary member.

5. The handle fixing mechanism of claim 1, wherein the first opening is from about 100 degrees to about 180 degrees apart from the second opening.

6. The handle fixing mechanism of claim 1, wherein the coupling member is configured to slidably received in the first opening or the second opening and the third opening when the first or the second opening is aligned with the third opening, and wherein the first end is configured to be received only in the first or the second opening but not in the third opening.

7. A lock system, comprising a stationary member, a hand operated member, and a coupling member, wherein the stationary member and the hand operated member are configured to be operably coupled by the coupling member, and wherein the coupling member is configured to remain within the stationary member and to extend into or retract from the hand operated member;
wherein the stationary member comprises a lock assembly, wherein the lock assembly comprises the cylindrical structure and an elongated core structure, and wherein the elongated core structure is configured to be housed within and to rotate concentrically with the cylindrical structure; and
wherein the elongated core structure comprises a driver portion corresponding to the position of the first opening or the second opening on the cylindrical structure and wherein the driver portion is configured to drive the coupling member into the third opening through the first or the second opening when aligned with the first or the second opening.

8. The lock system of claim 7, wherein the driver portion comprises a column having a cross section, wherein the cross section comprises a long axis and a short axis.

9. The lock system of claim 8, wherein, when rotating the elongated core structure, the driver portion having the long axis is configured to push the coupling member on the first end and therefore move the second end into the third opening when aligned with the first opening or the second opening coupling the cylindrical structure and the cylindrical housing.

10. The lock system of claim 9, wherein, when rotating the elongated core structure and aligning the driver portion having the short axis with the position of the first or the second opening, the coupling member is configured to be pushed out of the third opening on the second end through the third opening therefore separate the cylindrical structure from the cylindrical housing.

11. The lock system of claim 10, further comprising a lock cylinder, wherein the lock cylinder is rotationally coupled to the elongated core structure.

12. The lock system of claim 7, wherein the lock system is a door lock or a furniture lock.

13. A lock system, comprising,
an assembly comprising a cylindrical structure (1) and an elongated core structure (2) configured to be housed within the cylindrical structure (1), wherein the elongated core structure (2) is configured to rotate concentrically within the cylindrical structure (1), wherein the cylindrical structure (1) comprises a first opening (3a) and a second opening (3b), wherein the first opening (3a) is from about 100 degrees to about 180 degrees apart from the first opening (3b), wherein the elongated core structure (2) has a driver portion (11) corresponding to the position of the first opening (3a) and the second opening (3b), wherein the driver portion (11) comprises a cross section having a long axis and a short axis;
a hand operated member connected to the assembly, wherein the hand operated member comprises a cylindrical housing (6), wherein the cylindrical housing (6) is configured to house the cylindrical structure (1), wherein the cylindrical housing (6) comprises a third opening (5), and wherein the third opening (5) is configured to align with either the first opening (3a) or the second opening (3b); and
a coupling member (4) having a first end and a second end, wherein the coupling member is slidably received in the first opening (3a) or the second opening (3b) and is configured to slide into the third opening (5) when the first opening (3a) or the second opening (3b) is aligned with the third opening (5).

14. The lock system of claim 13, wherein the first opening (3a) or the second opening (3b) has a diameter not less than a diameter of the third opening (5), wherein the first end has a diameter not less than a diameter of the second end, and wherein the diameter of the first end is not less than the diameter of the third opening (5) so that the first end is configured to be slidably received in the first opening (3a) or the second opening (3b) but not in the third opening (5) and that the second end is configured to be slidably received in both the first opening (3a) or the second opening (3b) and the third opening (5).

15. The lock system of claim 13, further comprising a lock cylinder (7) housed within the cylindrical housing (6), wherein the lock cylinder (7) is rotationally coupled to the elongated core structure (2).

16. The lock system of claim 15, wherein the lock cylinder (7) is configured to receive and therefore rotate by a key, wherein the rotation of the key is configured to cause the rotation of the lock cylinder (7), and wherein the lock cylinder (7) is configured to cause the rotation of the elongated core structure (2).

* * * * *